Dec. 21, 1926.
J. I. ARBOGAST
1,611,328
METHOD AND APPARATUS FOR MANUFACTURING GLASS
Filed Dec. 1, 1924
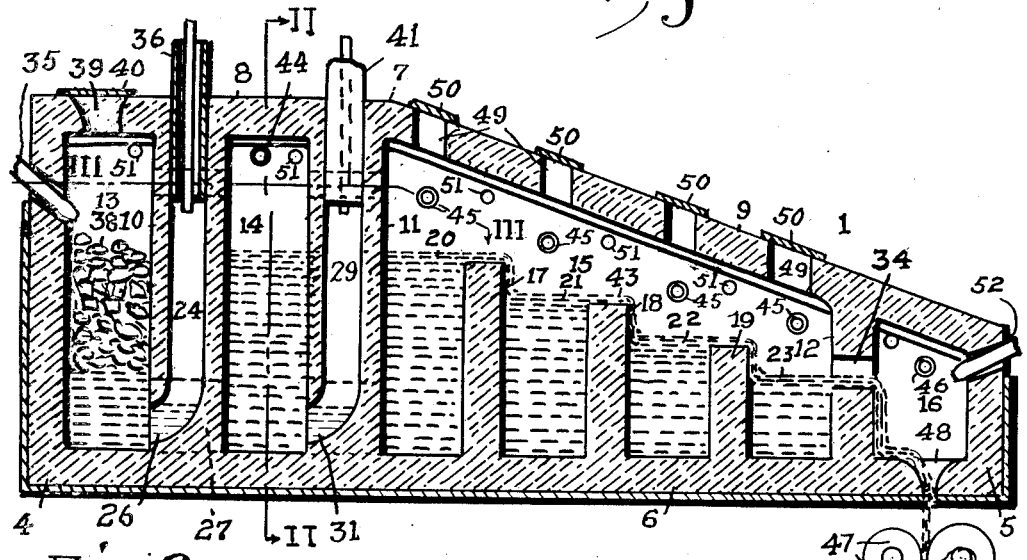
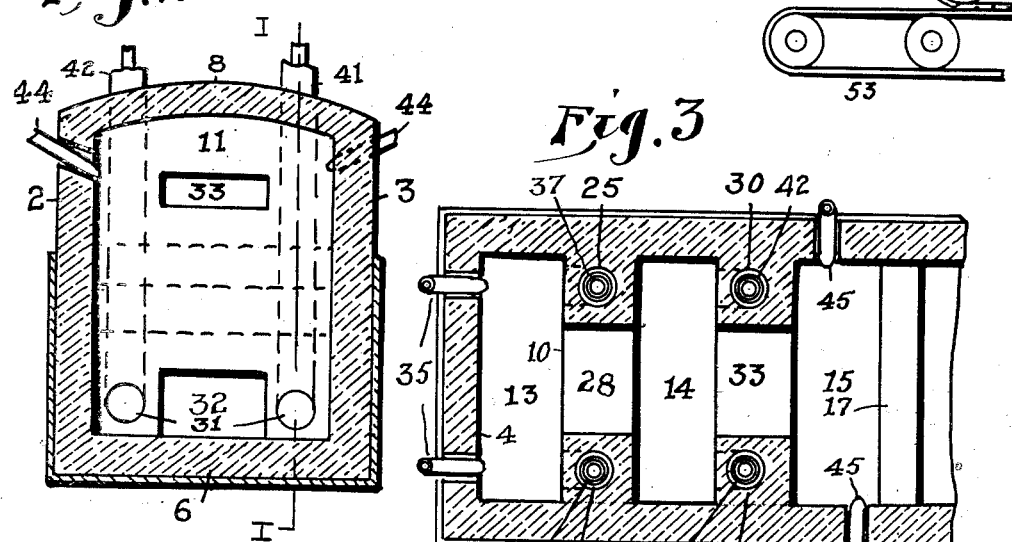

Patented Dec. 21, 1926.

1,611,328

UNITED STATES PATENT OFFICE.

JOHN I. ARBOGAST, OF PITTSBURGH, PENNSYLVANIA.

METHOD AND APPARATUS FOR MANUFACTURING GLASS.

Application filed December 1, 1924. Serial No. 753,092.

This invention relates to a method and apparatus for manufacturing glass, more particularly for the manufacture of sheet and plate glass, but it is to be understood that it is adapted for the manufacture of other glass products for which it is found applicable.

The primary object of the invention is to provide, in a manner as hereinafter set forth, a new and improved method and apparatus for producing a glass product of superior and uniform structure throughout by establishing the proper molecular adjustment of the molten glass to overcome the presence of seeds, blisters, cords and other defects existing in glass manufactured by the present methods.

The invention further aims to provide, in a manner as hereinafter referred to, a new and novel method and means for use in the manufacture of glass which will eliminate the use of a draft stack and obviates the necessity of handling the molten glass in pots for depositing the same to the shaping rolls or casting table; which is capable of being operated by ordinary skilled labor; which will greatly expedite the manufacture of glass products as it will function to discharge the molten glass at the proper annealing temperature, thereby eliminating the long annealing process requiring special annealing ovens and the disposition of the shaped products therein for reheating and for cooling for a considerable length of time, and under such conditions providing for the economical manufacture of glass of a high grade quality.

To the accomplishment of these and such other objects as may hereinafter appear, the invention consists of the new and novel method and means for manufacturing glass, as hereinafter more specifically described and illustrated in the accompanying drawing, but it is to be understood that the apparatus shown in the drawing is merely illustrative of an embodiment by which the method can be carried out, therefore various changes in the form, proportions and minor details of construction may be resorted to without departing from the principle or sacrificing any of the advantages of the invention which fall within the scope of the claims hereunto appended.

In the drawing wherein like numerals of reference designate corresponding parts throughout the several views:

Figure 1 is a longitudinal vertical sectional view of an apparatus for carrying out the method in accordance with my invention.

Figure 2 is a sectional view on line II—II, Figure 1.

Figure 3 is a sectional view on line III—III, Figure 1.

Referring in detail to the drawing the apparatus comprises an elongated furnace structure 1 consisting of a pair of vertically disposed side walls 2 and 3, a rear end wall 4, a front end wall 5, a bottom 6, and the arch top crown 7. The rear portion 8, of the crown 7, is disposed in a level plane, while the front portion 9 thereof is disposed to slope downwardly toward the front end of the structure.

The interior of the furnace structure 1 is provided with three vertically disposed transversely extending intermediate walls, indicated at 10, 11 and 12, respectively, whereby the interior of the furnace structure is divided into four separate chambers, namely, the charging or melting chamber 13, the refining chamber 14, the kneading chamber 15, and the discharging chamber 16, all of which are arranged in the order named from the rear to the front of the furnace structure.

The kneading chamber 15 is provided with three vertically disposed transversely extending spaced partitions 17, 18 and 19, which form, in connection with the walls 11 and 12, four collecting compartments 20, 21, 22 and 23, each of less height than the chamber 15. The partition 17 is of a greater height than the partition 18, and the latter is of a greater height than the partition 19. The partitions are of less height than the walls 11 and 12.

The rear portion 8, of the crown 7, is disposed over the charging and refining chambers 13 and 14, and the sloped forward portion 9, of the crown 7, is disposed over the kneading chamber 15 and the discharging chamber 16. The entire furnace structure 1 is constructed from suitable refractory material and its contour and arrangement is designed with a view of conserving space and heat and to best meet conditions found in practice.

The wall 10 is formed with a pair of vertically extending burner conduits 24 and 25, and each of which is arranged adjacent to one end thereof. The outlet 26 of each of the conduits 24 and 25 opens into the charging chamber 13 adjacent to the bottom thereof. The lower portion of the wall 10 is provided with a centrally disposed large opening 27 providing a passage for the flow of the molten glass from the charging chamber 13 to the refining chamber 14. The wall 10 is further formed with an opening 28 to permit of the passage of the heat from the charging chamber 13 to the other chambers of the furnace structure. The opening 28 is disposed near the upper end of the wall 10 to position the same above the highest possible molten glass level during the operation of the furnace.

The walls 10 and 11 are identical in construction and arrangement and the latter is likewise provided with a pair of similarly located burner conduits 29 and 30. The outlet 31, of each of the conduits 29 and 30, opens into the refining chamber 14. The opening 32, formed in the lower portion of the wall 11, provides a passage for the flow of the molten glass from the refining chamber 14 into the compartment 20. An opening 33 for the passage of the heat is formed in the top portion of the wall 11 and is positioned above the highest possible molten glass level.

The wall 12 is formed with an outlet opening 34 which is disposed on a plane below the top of the partition or wall 19 to allow the molten glass mass to flow by gravity from the compartment 23 into the discharging chamber 16.

The charging chamber 13 is provided with four burners indicated at 35, 36, and 37, respectively. The burners 35 are positioned in the rear wall 4 and are disposed above the glass batch 38, which is admitted into the charging chamber 13 through the opening 39 provided therefor in the rear portion 8, of the crown 7. The opening 39 is provided with a suitable cover 40 for maintaining the heat within the charging chamber 13 after the charging operation. The burner 36 extends into the burner conduit 24 and the burner 37 extends into the burner conduit 25. The burners 36 and 37 act against the lower portion of the glass batch 38 through the respective conduit outlets 26.

The refining chamber 14 is heated by a pair of burners 41 and 42, the former extending into the burner conduit 29 and the latter into the burner conduit 30. The burners 41 and 42 act against the lower portion of the molten glass mass 43 through respective conduit outlets 31. The refining chamber 14 is further heated by a pair of burners 44, one of which extends through each of the side walls 2 and 3 of the furnace structure and acts against the surface of the molten glass mass in the refining chamber 14.

The kneading chamber 15 is heated by a plurality of burners 45 which extend through the side walls 2 and 3 of the furnace structure preferably in staggered relation with respect to each other. The burners 45 act only against the surface of the molten glass mass 43 as it passes over the series of partitions 17, 18 and 19 by gravity during the operation of the furnace.

A burner 46 is mounted in each of the side walls 2 and 3 and extends into the discharging chamber 16. The burners 46 act against the molten glass mass as it flows from the compartment 23 through the opening 34 into the discharging chamber 16 and from the latter to the shaping rolls 47 through the aperture 48, provided therefor in the bottom of the discharging chamber 16.

All of the burners used in my improved furnace structure are of the forced draft type using any of the standard fuels namely, oil, gas, etc., and do not require a draft stack to stimulate combustion.

The sloped portion 9, of the crown 7, is formed with a plurality of vents 49 one of which is preferably disposed directly over the collective compartments 20, 21, 22 and 23, to provide for the escape of the heat from the kneading chamber 15 when it is desired to regulate the heat within the latter to the temperature desired. Each of the vents 49 is provided with a suitable cover 50 for closing the vents completely or partially as required.

A pyrometer 51 is connected in each of the chambers 13, 14 and 16 and several are mounted in the kneading chamber 15 due to its length. The pyrometers 51 register the temperature in the various parts and chambers of the furnace structure and the operator is guided thereby in regulating the various burners and vents to establish the constant temperatures desired throughout the furnace structure.

A cold blast apparatus 52 communicates with the discharging chamber 16 and is used for cooling the molten glass mass to establish the proper casting, shaping and annealing temperature and consistency of the latter before it passes from the discharging chamber 16 to the shaping rolls 47 and conveyor 53. The blast apparatus 52 is also utilized to harden the molten glass mass in the discharging chamber 16 when it is desired to discontinue the operation of the device.

It will of course be obvious that the greatest temperature is carried and required in the charging or melting chamber 13, with the temperatures successively decreased in the refining chamber 14, kneading chamber 15 and the discharge chamber 16.

As the glass batch 38 is melted to a fluid state, it will flow into the refining chamber 14 through the opening 27 in the wall 10, and into the compartment 20 through the opening 32 in the wall 11 and rise to a like level in the chambers 13 and 14 and in the compartment 20. When the molten glass mass reaches the height of the partition 17 it will overflow the latter into compartment 21, from there it will overflow the partition 18, into compartment 22, from there it will overflow the partition 19 and pass into the discharging chamber 16, through the opening 34 in the wall 12, and be discharged through the opening 48 to the shaping rolls 47.

The kneading action, to which the molten glass mass 43 is subjected on its passage over the partitions 17, 18 and 19 and into and out of the collecting compartments 20, 21, 22 and 23 in the kneading chamber 15, will establish the perfect molecular adjustment of the mass and produce a finished product of the highest quality.

As it is intended to feed the discharged molten mass directly to the forming rolls 47 and not transport the same in pots to the latter, the glass when shaped by the rolls will still be at the proper annealing temperature and need not to be reheated in ovens for the annealing process in the usual manner.

The use of my improved method and apparatus provides for continuous operation in producing glass products free from all seeds, blisters, cords and other defects commonly found in glass manufactured by methods now used in the art.

What I claim is:

1. A method of manufacturing glass consisting in passing a molten body of glass over a series of dams of different heights to provide a kneading action on said body to harmonize the molecules thereof and at the end of the kneading action on said body subjecting it to a cold blast to bring the body to an annealing temperature.

2. A method of manufacturing glass consisting in passing a molten body of glass over a series of dams of different heights to provide an intermittent kneading action on said body to harmonize the molecules thereof and at the end of the kneading action on said body subjecting it to a cold blast to bring the body to an annealing temperature.

3. An apparatus for manufacturing glass comprising a melting chamber, a refining chamber communicating therewith, a kneading chamber provided with a series of open top collecting compartments progressively decreasing in height from said refining chamber, means for establishing communication between the refining chamber and the collecting compartment of greatest height, a discharge chamber, and means for establishing communication between the discharge chamber and the collecting compartment of less height.

4. An apparatus for manufacturing glass comprising a melting chamber, a refining chamber communicating therewith, a kneading chamber provided with a series of open top collecting compartments progressively decreasing in height from said refining chamber, means for establishing communication between the refining chamber and the collecting compartment of greatest height, a discharge chamber, and means for establishing communication between the discharge chamber and the collecting compartment of less height, means for supplying heat to the lower portion of said melting and refining chambers, and means for supplying heat to the upper portion of said melting and refining chambers.

5. An apparatus for manufacturing glass comprising a melting chamber, a refining chamber communicating therewith, a kneading chamber, provided with a series of open top collecting compartments progressively decreasing in height from said refining chamber, means for establishing communication between the refining chamber and the collecting compartment of greatest height, a discharge chamber, means for establishing communication between the discharge chamber and the collecting compartment of less height, and means for supplying a cold blast to said discharge chamber.

6. An apparatus for manufacturing glass comprising a melting chamber, a refining chamber communicating therewith, a kneading chamber provided with a series of open top collecting compartments progressively decreasing in height from said refining chamber, means for establishing communication between the refining chamber and the collecting compartment of greatest height, a discharge chamber, means for establishing communication between the discharge chamber and the collecting compartment of less height, means for supplying heat to the lower portion of said melting and refining chambers, means for supplying heat to the upper portion of said melting and refining chambers, and means for supplying a cold blast to said discharge chamber.

7. An apparatus for manufacturing glass comprising a melting chamber, a refining chamber communicating therewith, a kneading chamber provided with a series of open top collecting compartments progressively decreasing in height from said refining chamber, means for establishing communication between the refining chamber and the collecting compartment of greatest height, a discharge chamber, means for establishing communication between the discharge chamber and the collecting compartment of less height, one of the walls of said melting and refining chambers being provided with means for supplying heat to the lower portions of said chambers.

8. An apparatus for manufacturing glass comprising a melting chamber, a refining chamber communicating therewith, a kneading chamber provided with a series of open top collecting compartments progressively decreasing in height from said refining chamber, means for establishing communication between the refining chamber and the collecting compartment of greatest height, a discharge chamber, means for establishing communication between the discharge chamber and the collecting compartment of less height, and heat supply means mounted in certain of the walls of each of said chambers 9. An apparatus for manufacturing glass comprising a closed furnace structure provided with a kneading chamber formed with a series of molten glass collecting compartments, progressively decreasing in height from one end of said chamber to the other, the higher of each of said compartments formed to overflow at its top into an adjacent lower compartment, means for receiving the overflow from the lowest of said compartments and further for discharging the same, and means for supplying molten glass to the higher compartment at the bottom thereof.

In testimony whereof I affix my signature.

JOHN I. ARBOGAST.